United States Patent [19]

Snyder et al.

[11] Patent Number: 4,522,447

[45] Date of Patent: Jun. 11, 1985

[54] FOAM SEAT AND BACK CUSHIONS

[76] Inventors: William F. Snyder, 2174 Temple Rd.; Nelson P. Snyder, 702 West Charles St., both of Bucyrus, Ohio 44820

[21] Appl. No.: 303,052

[22] Filed: Sep. 17, 1981

Related U.S. Application Data

[63] Continuation-in-part of Ser. No. 123,573, Feb. 2, 1980.

[51] Int. Cl.³ ............................................... A47C 7/02
[52] U.S. Cl. ............................. 297/452; 297/DIG. 1; 5/464
[58] Field of Search ................. 297/452, 456, DIG. 1; 5/464, 481

[56] References Cited

U.S. PATENT DOCUMENTS

| | | | |
|---|---|---|---|
| 2,659,418 | 11/1953 | Berman | 5/464 |
| 3,070,402 | 12/1962 | Stanton | 297/452 X |
| 3,337,884 | 8/1967 | Meier | 297/DIG. 1 |
| 3,612,607 | 10/1971 | Lohr | 297/DIG. 1 |
| 3,751,111 | 8/1973 | Taylor et al. | 297/DIG. 1 |
| 3,846,857 | 11/1974 | Weinstock | 5/464 |
| 3,939,508 | 2/1976 | Hall et al. | 297/DIG. 1 |
| 4,053,957 | 10/1977 | Regan | 5/464 |
| 4,086,675 | 5/1978 | Talbert et al. | 297/DIG. 1 |
| 4,143,435 | 3/1979 | Masuda | 5/481 |
| 4,161,045 | 7/1979 | Regan | 5/464 |

Primary Examiner—Francis K. Zugel
Attorney, Agent, or Firm—Sidney W. Millard

[57] ABSTRACT

Disclosed is a seat cushion constructed of cellular elastic material wherein its design provides more uniform distribution of supportive forces exerted by the cushion over a larger area of the anatomical portions of a person seated thereon for minimizing squeezing and restriction of arteries and nerves located in the anatomical portions of a person seated on the cushion. The cellular elastic material of the seat cushion is divided into segments having different moduli of elasticity. The modulus of elasticity of each segment is inversely proportional to the pressure exerted on such segment by the anatomical portion of a person seated on the cushion. Also disclosed is a back cushion of similar design.

16 Claims, 4 Drawing Figures

DISTRIBUTION PATTERN OF BODY PRESSURES (IN PSI) AGAINST STATIONARY SEAT

FOAM SEAT AND BACK CUSHIONS

This application is a continuation-in-part of copending U.S. patent application Ser. No. 123,573 filed Feb. 2, 1980.

BACKGROUND OF THE INVENTION

The present invention relates to seat cushions and backrests and more specifically to cushions and backrests which support the human body without creating pressure points or areas of contact which support disproportionate weight distributions. Such disproportionate weight distributions often cause circulatory disfunction in the extremities after prolonged periods of immobility.

Since the erect position presents many anatomical disfunctions in the lower portions of the human anatomy, the sitting position creates even more problems of reduced circulatory efficiency due to restrictions in the normal flow of blood to and from the legs. The normal positions of the arteries, veins, and nerves are squeezed, pinched, and kinked by the displacement of muscle tissue and fat tissue when a person sits. These problems are accentuated due to the firmness of the underlying skeleton supporting the upper torso.

Specifically, the ischial tuberosities and the coccyx exert as much as 80% of the weight of the torso in an area confined to a triangle about five inches on a side with its apex to the rear. This force concentration or pressure accounts for "hitting bottom" or "bottoming out" of a person on a cushion after prolonged sitting or the premature complete compression of the cushion upon which the person is sitting. As the body is moved from an erect attitude in order to avoid discomfort to these anatomical portions of greatest weight support, the position and subsequent distribution of weight on the spinal column is changed, thus causing posterior movement of the vertebrae in the lumbar region. Such movement causes stretching of the deltoid muscles of the back, irregular pressure on the vertebral discs, emphasis and increased pressure on the coccyx, and the like. Stretch of the deltoid muscles reduces the supportive and strength capabilities of these muscles which causes further relaxation and posterior curvature of the spine. Such further relaxation and posterior curvature of the spine causes additional pressure on the anterior side of the discs yielding nervous stress and subsequent reduction of efficiency. Holding the deltoid muscles in their stretched position brings on eventual premature fatigue of the individual.

Since the arteries and nerves are located to the rear of the skeleton especially in the extremities (presumably to protect them from injury), it follows that the sitting attitude of a person causes constriction and squeezing of these arteries and nerves between the femur and the cushion substructure of the chair or seat being sat upon, especially on the popliteal region behind the knee-joint. Resulting circulatory disfunction and nerve pinching are especially experienced by people whose occupations require long periods of sitting, such as stenographers, technicians in laboratories, computer operators, motorists, telephone operators, confinees of wheelchairs, and the like.

The art is replete with solutions to the above-described problem. Exemplary patents disclosing chairs specially designed to alleviate the foregoing problems include U.S. Pat. Nos. 3,193,328, 3,380,410, and 3,261,037. Also, attempts have been made to specially design beds in order to make them more anatomically acceptable as in U.S. Pat. No. 3,885,258. Such prior art proposals for providing specially designed chairs, beds, and the like, usually involve structures which are extremely complicated and expensive to manufacture. For example, U.S. Pat. No. 4,161,045 describes a mattress having large number of relatively incompressible ribs inserted into the mattress. The formation of this mattress requires that the main part of the mattress be formed in two pieces, that channels be cut in both parts of the mattress to accomodate ribs, that the ribs be inserted into the channels and finally that the two parts of the mattress be secured together. Such a complicated assembly is time-consuming and expensive.

Some of the prior art proposals for supporting the human body without creating pressure points involve varying the density of the elastic material from which a cushion or mattress is formed in direct proportion to the pressure upon any particular portion of the cushion or mattress; a typical example of such prior art proposals is U.S. Pat. No. 3,751,111. We have now discovered that such proposals are incorrect and exacerbate rather than ameliorate the problem. Providing less elastic material at points of high pressure only increases the pressure at these points, thus placing even greater pressure upon the arteries and nerves and causing even greater circulatory disfunction and nerve pinching. It should be noted that this extra pressure concentration caused by putting the hardest parts of the cushion or mattress in contact with the parts of the body exerting maximum pressure is not described in the literature and was only discovered during our researches leading up to the instant invention.

A further problem with some of the prior art proposals for variable-density cushions, including the aforementioned U.S. Pat. No. 3,751,111, is that they propose to construct the composite cushion by placing preformed blocks of one type of elastic foam material (usually the higher density material, since it is normally the higher density material which is in the form of discontinuous inserts within a matrix of lower density material) in a mold and then foam the lower density material around the preformed blocks of higher density material, thus securing the blocks in the correct relative positions. Although this has not previously been described in the literature, we have found that when one type of foam is foamed in situ around a preformed block of a second type of foam, a chemical reaction takes place between the foam which is being formed and the pre-existing foam, and this chemical reaction leads to the formation of a skin of material along the surfaces where the two foams are in contact, this skin being considerably harder and less resilient then either of the foams from which it is derived. Where, as is inevitably the case at some points, this skin of hard, non-elastic material extends perpendicular to the flat surface of the cushion on which the user sits, the user receives the very uncomfortable sensation of sitting on a sharp edge of hard material, which is not only uncomfortable but which further exacerbates the problems with circulation and nerve pinching already mentioned.

It might be thought that the problems associated with the hard skin formed when one foam is foamed in situ around an insert of another foam could be avoided by foaming the first foam in contact with a solid former of a material to which the foam will not adhere, and then removing the solid former and replacing it with the desired insert of the second foam. However, our researches have shown that this also is an unsatisfactory procedure in many cases because when commercial polyurethane and some other foams are foamed in contact with a solid former a tough skin is formed adjacent the former and this tough skin again produces localized, almost non-deformable areas in the cushion which cause discomfort to the user and exacerbate the aforementioned circulatory disorders and nerve pinching.

According, there is a need for a cushion which will avoid the aforementioned problems associated with prior art cushions, and for a method for forming such a cushion. This invention provides such a cushion and method for forming the cushion.

BROAD STATEMENT OF THE INVENTION

The invention provides a seat or back cushion comprising cellular elastic material, this material being divided into segments having different moduli of elasticity, the modulus of elasticity of each segment being inversely proportional to the pressure exerted on that segment by the anatomical portion of a person seated against said cushion to more uniformly distribute the supportive forces exerted by the cushion over a larger area of said anatomical portions, the segments comprising pre-formed blocks of the cellular elastic material assembled to form the cushion.

The invention also provides a method of forming a seat or back cushion, the method comprising foaming a plurality of blocks of cellular elastic material, at least one of the blocks having a modulus of elasticity different from that of another one of the blocks, cutting from each of the blocks at least one segment of the cushion, and assembling the segments to form the cushion, such that the modulus of elasticity of each segment is inversely proportional to the pressure exerted on such segment by the anatomical portion of a person seated against said cushion to more uniformly distribute the supportive forces exerted by the cushion over a larger area of these anatomical portions.

Note that, contrary to the teachings of the prior art, in the instant cushion the modulus of elasticity of each segment is made inversely proportional to the pressure exerted on the segment by a person in contact with the cushion. In other words, those segments of the instant cushion in contact with the points of maximum pressure exerted by a person in contact therewith are the softest segments of the cushion, not the hardest as in the prior art. This makes the instant cushion a highly effective solution to the problem of artery and nerve squeezing and restriction due to a person remaining seated for an extended period of time. Moreover, the seat or back cushion of the invention is extremely inexpensive to manufacture since the manufacturing process is simple and can be performed by unskilled labor and the cushion is easily adaptable to a multitude of practical uses.

The preferred thickness for both the seat and back cushions of the invention is about 1.5 to about 3.5 inches. Desirably, the various segments of the cushion are adhesively secured to one another, although in some cases, especially when the cushion is immediately enclosed within a cushion cover, it may be possible to dispense with such adhesive since most commercially-available foam materials will adhere to one another sufficiently to enable them to be assembled together to form the cushion, which can then be inserted directly into the cushion cover which will thereafter hold the various segments in their correct relative positions.

DETAILED DESCRIPTION OF THE INVENTION

Figure 1:
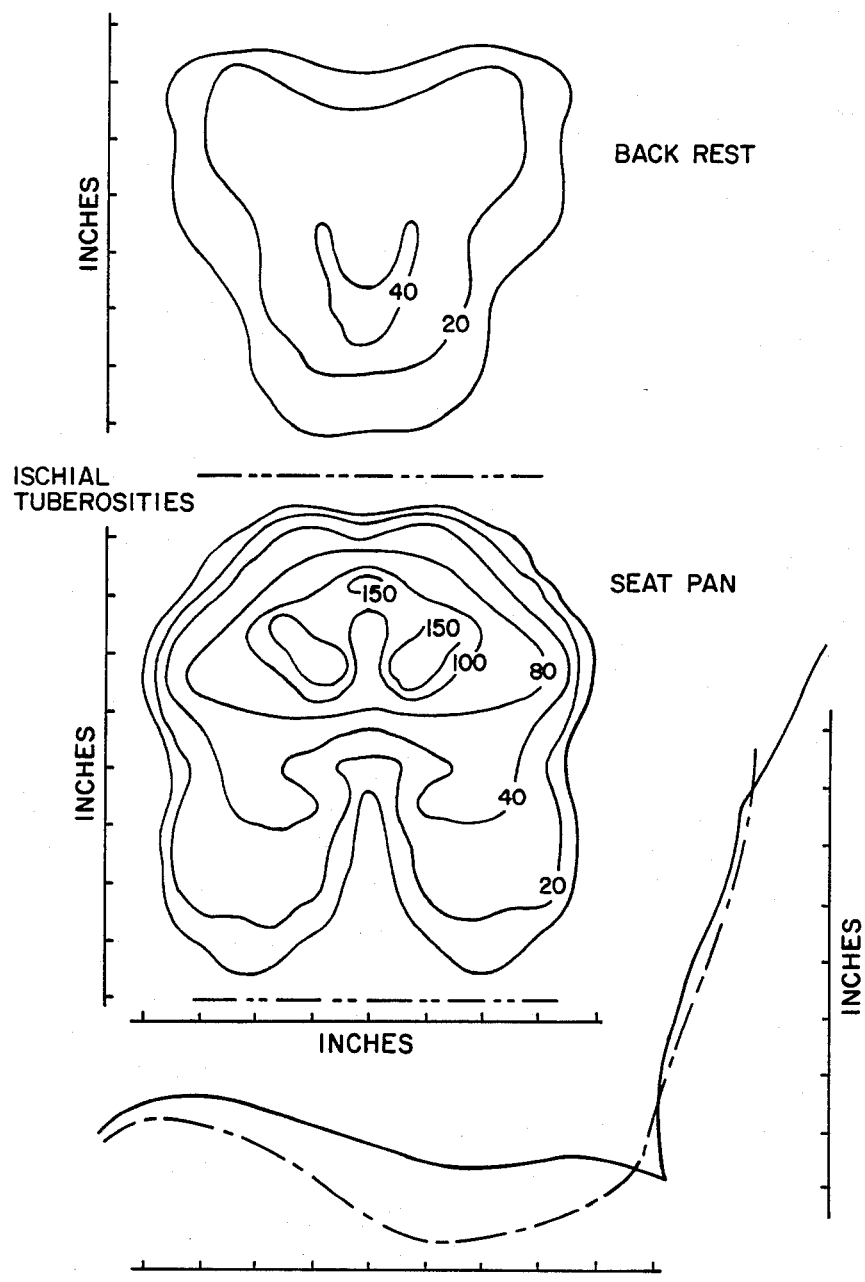
FIG. 1 represents the distribution pattern of body pressures (in p.s.i.) against a stationary seat.

In order to more fully understand the problems associated with a person in the sitting position, reference is made to FIG. 1 which shows the distribution pattern of body pressures (in p.s.i.) against a stationary seat. Note that the greatest body pressure is found in a triangle in the rear center portion of the seat which point corresponds to the ischial tuberosities and the coccyx of a person seated on such stationary seat. Note that in areas outside of this triangle of high body pressure, the pressures decrease significantly. Such uneven pressure of the human torso on a seat causes the squeezing of nerves and constriction of arteries which lead to extreme discomfort to the person seated. The same is also true of the pressures exerted against the backrest as seen in FIG. 1. The net result of such body pressures is depicted in the graph at the bottom of FIG. 1 which shows the well-known anthropological curve of a person in the seated position. Prior solutions to these problems typically are based upon providing the greatest resistive forces in a seat cushion corresponding to the greatest body pressure points and less resistance in the seat cushion corresponding to those areas of less body pressure. Unfortunately, such solutions are incorrect and only accentuate the problem attempted to be solved. The present invention however, provides segmented cellular elastic material acting individually and in concert which is systematically arranged to offer true comfort and support to a person seated thereon. Such arrangement of the material segments yields a cushion for the human anatomy which takes into consideration the distribution of weight of a person in the sitting attitude. This allows conformation of the cushion to the buttocks, and the structure of the skeletal frame, including the pelvic girdle, the ischium, the ilium, the sacral symphysis, the tuberosities of the ischium, the coccyx and the hip joints including femoral tuberosities.

Figure 2:
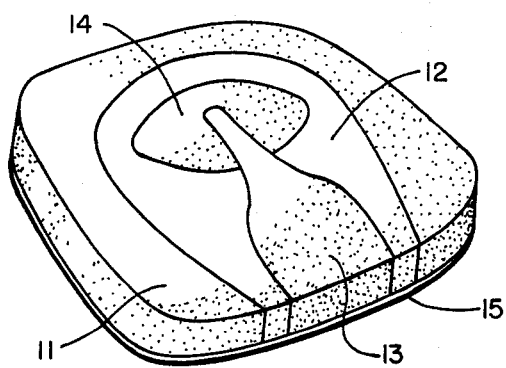
FIG. 2 depicts a seat cushion embodying the present invention, the cushion being shown inverted to show the segments thereof.

The seat cushion shown in FIG. 2 comprises a first substantially horseshoe-shaped segment forming both side edges and the rear edge of the seat cushion, a second, substantially horseshoe-shaped segment disposed within the first segment and being open at the front edge of the cushion (turned towards the viewer in FIG. 2), a third, substantially wedge-shaped segment disposed within the second segment and extending rearwardly from the front edge of the cushion, this third segment tapering from the front edge towards the rear edge of the cushion and extending more than half way from the front edge toward the rear edge of the cushion. The seat cushion shown in FIG. 2 also comprises a fourth, substantially elliptical prismatic segment having its major axis extending substantially across the width of the cushion, this fourth segment lying within the second segment and surrounding the rear end of the third segment, the third segment extending into an indentation formed in the forward wall of the fourth segment. The first, second, third and fourth segments of the cushion shown in FIG. 2 are all prismatic in shape, the axes of the prisms lying perpendicular to the flat upper face of the cushion on which the user sits. A fifth flat segment is provided extending over the full area of the cushion above the other segments, but this fifth segment can be omitted if desired.

In the cushion shown in FIG. 2, the foam of the first and third segments (designated 11 and 13 respectively) has a relatively high modulus of elasticity, the foam of the second segment (designated 12) has a lower modulus of elasticity and the foam (designated 14) of the fourth segment has a still lower modulus of elasticity. The foam of the fifth segment (designated 15), when present, should have a relatively high modulus of elasticity, conveniently the same as that of the first and third segments.

By framing the perimeter of the cushion (except for part of the front edge thereof) with the extra firm cellular elastic material 11, as well as framing the inside of the legs and the perineum with the extra firm material 13, more of the weight of the torso is supported on the outside of the skeletal frame, including the upper legs where nerves and blood vessels are at a lower concentration. Further support of the anatomy is accomplished by the intermediate modulus cellular elastic material 12, which supports the gluteal region and the long, hamstring muscles of the upper leg. The area of the support provided by the material 12 reduces the stretch of the ham-string muscles which otherwise occur in soft uniform cushions. The variable density and modulus of elasticity of the various materials 11, 12, 13, and 14 reduces fatigue in these lower muscles as well the muscles of the back, and further reduces flaccidity of muscle tissue which occurs in persons required to sit for long periods without moving from one position.

In the triangular area which normally exerts the greatest torso pressure on a cushion, the weight of the user is distributed over a larger area by the low density and low modulus of elasticity cellular elastic material 14 which, as already mentioned, is in the form of an eliptical prism. The relatively soft material 14 allows the unyielding ischial tuberosites and the coccyx to contact this soft material to relieve pressure on these anatomical portions until the remainder of the seat cushion area has met the user's anatomy and been compressed to the planned degree of compression; material 14 then offers support to these anatomical portions where the pressure is normally greatest. Support for the anatomy of the user is thus attained relatively uniformly without severe pressure points. The flat segment of material 15 ensures a uniform thickness to the cushion and ensures stability of the other four segments of the cushion, that is to say the material 15 serves to reduce the shear strain on the vertical faces of the other segments which are adhesively bonded to one another. The material 15, which lies adjacent the surface on which a user sits, also helps to provide a uniform "feel" to the cushion so that the user is not aware of the differing foam densities therein.

The preferred dimensions for the cushion shown in FIG. 2 are as follows. The cushion preferably measures about 18.75 inches in width and 17 inches deep between the front and rear edges. The second segment of foam 12 has a maximum width of about 14 inches and extends about 15 inches from the front edge of the cushion. The two limbs of the second segment of material 12 are each about 2.5 inches wide at the front edge of the cushion. The third segment of material 13 is about 5.5 inches wide at the front edge of the cushion and the third segment has a depth of about 12 inches (composed of a lower, larger region of about 7.5 inches and a narrow upper region of about 4.5 inches). The elliptical fourth segment of material 14 has a major axis of about 9 inches and a minor axis of about 5 inches.

The seat cushion shown in FIG. 2 may be easily and economically manufactured by forming three different slabs of material of correct elastic moduli for the segments 11/13, 12 and 14 respectively. These slabs are formed having a uniform thickness equal to that of the first, second, third and fourth segments in the final cushion (if the cellular elastic material used to form the cushion is produced by foaming and the foam is of a type which produces a relatively hard "skin" where it is in contact with the mold in which it is formed, this hard skin should be removed from the slabs before the various segments of the cushion are cut therefrom). The first, second, third and fourth segments of the cushion are then cut from the appropriate slabs using commercially available equipment (for example of the jig-saw type), the cuts being made perpendicular to the flat parallel faces on either side of the slabs, so that the segments are of prismatic form. The segment are then assembled together in the correct spatial relationship to form the cushion, adhesive being placed on at least one of the faces where faces of different segments come into contact with one another. The flat fifth segment, which can be prepared in any conventional way known for forming flat pieces of elastic cellular material, is then secured to the tops of the other four segments by means of adhesive.

Figure 3:
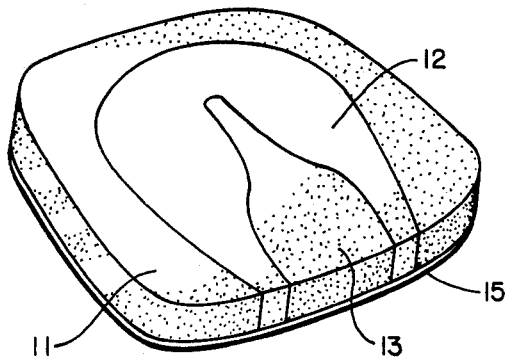
FIG. 3 depicts an alternative embodiment of a seat cushion of the present invention, the cushion being shown inverted to show the segments thereof.

The seat cushion shown in FIG. 3 is generally similar to that shown in FIG. 2 except that the elliptical fourth segment of the cushion shown in FIG. 2 is omitted, the second segment being expanded to take the place of the missing fourth segment. Thus, the optional flat segment of material 15 becomes the fourth segment of the cushion. The weight distribution on the cushion depicted in FIG. 3 is not as uniform as that obtained by the cushion depicted in FIG. 2. However, the supportive forces exerted by this cushion are distributed over a larger area of the anatomical portions of a person seated thereon than occurs in a cushion of uniform material.

The instant invention is applicable not only to seat cushions but also to back cushions. The variable density cellular materials used in forming the instant seat cushion can be arranged so that a person seated thereon adopts an erect posture. Preferably, the instant seat cushion is used in a chair or seat assembly in conjunction with a back cushion of the instant invention which provides predictable placement for a back support.

Figure 4:
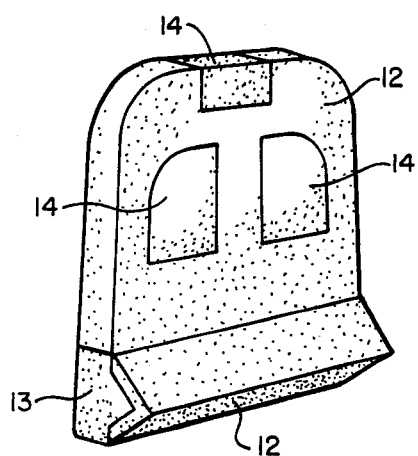
FIG. 4 depicts a back cushion of the present invention.

The back cushion of the instant invention shown in FIG. 4 comprises a first, substantially cuboidal segment forming the major portion of the cushion; in FIG. 4 although the first segment is substantially cuboidal, the upper corners of the segment are rounded, but a completely cuboidal segment can be used if desired. An indentation is formed in the upper edge of the first segment and extends across the center line of the cushion, while a pair of apertures, each of which has the form of a rectangle with its upper outer corner rounded off, are formed in the upper part of the first segment, this pair of apertures being symmetrically disposed on either side of the vertical center-line of the first segment. A second segment of the cushion is disposed within the indentation of the first segment, while third and fourth segments of the cushion are disposed in the pair of apertures in the first segment. A cuboidal fifth segment of the cushion is disposed along the lower edge of the first segment and extends forwardly beyond the forward face of the first segment. In this particular cushion, the forwardly projecting part of the fifth segment has the form of a triangular prism having one of its side faces lying substantially in the plane of the front face of the first segment and a sixth segment is provided covering the two exposed side faces of this triangular prismatic portion. The triangular prismatic portion of the fifth segment is, in this particular back cushion, a right triangular prismatic portion having its hypotenuse in the plain of the front face of the first segment.

The various foam materials used in the back cushion shown in FIG. 4 are identified by the same reference numerals as in FIGS. 2 and 3. Thus, the first and sixth segments of the back cushion are formed from the intermediate-density foam material 12, while the second, third, and fourth segments are formed from the low-density material 14. The second segment accomodates the head of the user, while the third and fourth segments accomodate the scapulae. The fifth segment is formed of the extra-firm material 13 to accomodate the lower back and lumbar region, the intermediate-density covering of the sixth segment providing a comfortable feel when the cushion is in contact with a user's back. The triangular prismatic portion of the fifth segment desirably extends about three inches forwardly of the front face of the first segment (measured perpendicular to that plane) and the sixth segment is desirably about one and one-half inches thick. Optionally, the back rest in the lower back area formed by the triangular prismatic portion of the fifth segment may be made adjustable in the direction of the seat area to further accomodate the user's lower back. Such adjustment can be provided by a seat back which is hinged horizontally in the center or by providing a movable insert.

The segments of cellular elastic material used to form the seat cushion and back support of the present invention have different moduli of elasticity such as measured by Young's modulus of elasticity. For cellular material, though, density more often will dictate the relative stiffness or firmness of the material and will be a useful gauge in determining the modulus of elasticity of the segments to be utilized in forming the seat cushion of the present invention. The modulus of elasticity of each segment is inversely proportional to the pressure exerted on such segment by the anatomical portion of a person seated on the cushion as is shown in the description of the seat cushions depicted in the drawings. Such arrangement of the segments and their inverse relationship to the pressure exerted thereon provides more uniform distribution of the supportive forces exerted by the cushion over a larger area of the anatomical portions of a person seated on the cushion. This translates into a change in the force vector of the cushion which balances the force of a person seated on the cushion. The force vector of the cushion is tilted more to the front portion of the seat cushion by virtue of additional support being provided by material 11 and 13 as shown in FIGS. 2 and 3. An almost buoyant effect is created thereby.

The cellular elastic material forming the seat cushion typically is about 1½ to about 3½ inches in thickness. Thicknesses of less than about 1½ inches are insufficient for preventing bottoming out of virtually the entire areas of the cushion being sat upon using present day commercially-available cellular elastic materials. Thicknesses greater than about 3½ inches are unnecessary as compression of the materials usually does not exceed this value and, thus, additional thickness merely provides an ostensibly non-compressible bottom support which preferably is used for the seat cushion of the present invention. It will be appreciated that depending upon the density or modulus of elasticity of the particular cellular elastic materials of choice in forming the seat cushion that the foregoing thicknesses of the cushion and back rest may vary significantly and such variation is within the spirit of the present invention. Preferably, the thickness of the seat cushion ranges from about 2 inches to about 3½ inches. In determining the precise materials and their corresponding moduli of elasticity in forming a seat cushion according to the precepts of the present invention, certainly, the particular foam used in forming cellular elastic material 14 of FIG. 2 and/or material 12 of FIG. 3 should be of sufficient firmness or have a sufficiently high modulus of elasticity that such material will not be fully compressed for a bottoming out effect for the designed weight load of the seat cushion. Since weights of people vary greatly, the seat cushion of the present invention can be designed for typical weights of those people for which the seat cushion is designed. That is, the seat cushion can be designed for the weights of people in certain occupations, such as seat cushions for truck drivers wherein normally heavier men will be using the seat cushion and for chairs intended for secretaries wherein lighter weight women normally will be using them. Clearly, the foregoing is an exemplary description only. Alternatively, the seat cushion can be designed for general distribution and use wherein the typical average weights of the population will be used in determining the particular cellular elastic materials for manufacturing the seat cushion and back rest of the present invention.

The cellular elastic materials useful in the present invention typically are foamed elastic materials. The term elastic is used herein to describe a substance that assumes its original shape after a force, causing distortion, is removed. The preferred material for construction of the seat cushion and back support of the present invention include polymeric cellular materials such as foamed plastics including, for example, foamed polyethers, foamed polyurethanes, and the like. Additional suitable materials include elastomeric cellular materials such as, for example, various natural and synthetic elastomers including natural rubber, polychlorobutadiene, polybutadiene, polyisoprene, styrene-butadiene rubber, butyl rubber, nitrile rubber, ethylene-propylene copolymer, fluorene elastomers, polyacrylates, silicone rubbers, polysulfide rubbers, halogen substituted rubbers, and the like. These materials are commercially available presently and many are already in use for forming conventional seat cushions and back supports as is well known in the industry. It should also be appreciated that different materials may be used for forming the various segments of the seat cushion and such varied materials even may have the same density, but due to their inherent physical property differences one may still obtain a differential in the moduli of elasticity of such segments for forming the seat cushion and back rest of the present invention.

In manufacturing the seat and back cushions of the present invention, the variable density materials most simply can be bonded together by adhesives or lamination, though other manufacturing techniques may be used as is necessary, desirable, or convenient. Economy and expediency often dictate the manufacturing technique of choice. Occasionally, the segments of different density (compressibility) will be required to be used in different thicknesses. Under these circumstances, additional firmer or higher density material may be placed under the less thick areas to provide an overall same thickness to all segments of the cellular elastic material which forms the seat or back cushion of the present invention. Also, it may be desirable to adhere or laminate a layer of average density material to the entire lower or back area of the cushions.

The cushions must be provided with an ostensibly non-compressible or fixed bottom or back for use in chairs or similar articles of manufacture. Springs or the like may be used under the cushions if desired. The cover for the cushions must be somewhat elastic as a non-elastic cover would distort the density (or modulus of elasticity) differential in the segments thereby distorting the beneficial variable support achieved by the present invention. Cloth or similar material of sufficient elasticity is the preferred material of choice to cover the cushions of the present invention.

By way of example, the cushions shown in FIGS. 2–4 may have the materials 11 and 13 of a polyurethane foam of grade P-7900, the materials 12 and 15 (when present) of a similar foam of grade P-3500 and the segment 14 (when present) of a similar foam of grade P-1300 all foam grades being measured by American Society for Testing and Materials Standard D-1564 (hereinafter referred to as ASTM-D-1564 which is incorporated herein by reference.) The main properties of these foam grades are set out in the following table:

| Property | P-1300 | P-3500 | P-7900 |
| --- | --- | --- | --- |
| Density (lbs./cu. ft.) | 1.10–1.20 | 1.20–1.30 | 4.0–4.5 |
| ILD on 4" at 25% deflection (lbs.) | 17.0–23.0 | 28.0–34.0 | 60.0–75.0 |
| Resiliency (%) | 41.0 min. | 40.0 min. | 40.0 min |
| Tensile (PSI) | 10.5 min | 12.0 min. | 10.5 min. |
| Elongation (%) | 250 min. | 190 min. | 105 min. |
| Tear (lbs./in.) | 1.75 min. | 1.70 min. | 1.0 min. |
| Compressibility Set at 156° F. | | | |
| 90%, 22 Hrs. (% Set) | 10.0 max. | 10.0 max. | 10.0 max. |
| 90%, 6 Hrs. (% Set) | 7.0 max. | 6.0 max. | 6.0 max. |

Although cushions produced using the above foam materials are adequate for some purposes, after extended use in certain applications foam fatigue has been observed when cushions made from the above materials are exposed to lenghtly wear. Accordingly, we prefer to make the instant cushions from a high-resistant polyurethane foam. Preferably, in the cushions shown in FIGS. 2–4, the materials 11 and 13 are of foam grade 50HR the materials 12 and 15 (when present) are of foam grade 30HR and the material 14 (when present) is of foam grade 20HR, all foam grades being measured by the aforementioned standard ASTM-D-1564. The main properties of these high-resistant polyurethane foams are given in the following table:

| Property | 20 HR | 30 HR | 50 HR |
| --- | --- | --- | --- |
| Density (lbs./cu. ft., min.) | 2.00 | 2.00 | 3.00 |
| ILD on 4" at 25% deflection (lbs.) | 17.0–23.0 | 27.0–33.0 | 45.0–55.0 |
| Resiliency (% min.) | 55.0 | 55.0 | 55.0 |
| Tensile Strength (PSI, min.) | 10.0 | 10.0 | 10.0 |
| Elongation (%, min.) | 150 | 150 | 150 |
| Tear strength (lbs/in., min.) | 1.20 | 1.20 | 1.20 |
| Compression Set 90% | 10.0 | 10.0 | 10.0 |

We claim:
1. A seat cushion comprising cellular elastic material, said material being divided into segments having different moduli of elasticity, the modulus of elasticity of each segment being inversely proportional to the pressure exerted on such segment by the anatomical portion to a person seated against said cushion to more uniformly distribute the supportive forces exerted by the cushion over a larger area of said anatomical portions, said segments comprising pre-formed blocks of said cellular elastic material assembled together to form said cushion, a first, substantially horseshoe-shaped segment forming both side edges and the rear edge of said seat cushion;

a second, substantially horseshoe-shaped segment disposed within said first segment, said second segment being open at the front edge of said cushion;

a third, substantially wedge-shaped segment disposed within said second segment and extending rearwardly from said front edge of said cushion, said third segment tapering from said front edge toward said rear edge of said cushion and extending more than halfway from said front edge toward said rear edge of said cushion; and a fourth, substantially elliptical prismatic segment having its major axis extending substantially across the width of said cushion, said fourth segment lying within said second segment and surrounding the rear end of said third segment, said third segment extending into the indentation defined by the forward wall of said fourth segment, said first and third segments being relatively firm and said second and fourth segments being relatively soft.

2. A cushion according to claim 1 which is between about 1.5 and about 3.5 inches in thickness.

3. A cushion according to claim 1 wherein said cellular elastic material comprises foamed plastic or foamed elastomer.

4. A cushion according to claim 3 wherein said material comprises foamed polyurethane.

5. A cushion according to claim 1 wherein said segments are adhesively secured to one another.

6. A seat cushion according to claim 1 wherein a fifth, flat segment is provided extending over substantially the full area of said cushion above said other segments.

7. A seat cushion according to claim 1 wherein said first and third segments have a foam grade of P-7900, said second segment has a form grade of P-3500 and said fourth segment has a foam grade of P-1300, all foam grades being measured by ASTM-D-1564.

8. A seat cushion according to claim 6 wherein said first, third and fifth segments have a foam grade of P-7900, said second segment has a foam grade of P-3500 and said fourth segment has a foam grade of P-1300, all foam grades being measured by ASTM-D-1564.

9. A seat cushion according to claim 1 wherein said first and third segments have a foam grade of 50HR, said second segment has a foam grade of 30HR and said fourth segment has a foam grade of 20HR, all foam grades being measured by ASTM-D-1564.

10. A seat cushion according to claim 6 wherein said first and third segments have a foam grade of 50HR, said second and fifth segments have a foam grade of 30HR and said fourth segment has a foam grade of 20HR, all foam grades being measured by ASTM-D-1564.

11. A seat cushion according to claim 1 wherein said first and third segments have a foam grade of 50HR and said second and fourth segments have a foam grade of 30HR, both foam grades being measured by ASTM-D-1564.

12. A method of forming a seat or back cushion according to claim 1, said method comprising:

forming a plurality of blocks of cellular elastic material, at least one of said blocks having a modulus of elasticity different from that of another one of said blocks;

cutting from each of said blocks at least one segment of said cushion; and assembling said segments to form said cushion, such that the modulus of elasticity of each segment is inversely proportional to the pressure exerted on such segment by the anatomical portion of a person seated against said cushion to more uniformly distribute the supportive forces exerted by the cushion over a larger area of said anatomical portions.

13. A method according to claim 12 wherein said segments are adhesively secured together to form said cushion.

14. A method according to claim 12 wherein said blocks are formed by foaming a foam precursor.

15. A method according to claim 14 wherein said foam precursor comprises a polyurethane pre-polymer.

16. A method according to claim 12 wherein said blocks are formed as slabs having a pair of substantially parallel faces and at least two of said segments are cut from said slabs by cuts extending substantially perpendicular to said parallel faces so that said at least two segments have the form of prisms having a length equal to the distance between said parallel faces.

* * * * *